Patented Apr. 12, 1932 1,853,353

UNITED STATES PATENT OFFICE

CLYDE O. HENKE, OF SOUTH MILWAUKEE, WISCONSIN, ASSIGNOR, BY MESNE ASSIGNMENTS, TO NEWPORT INDUSTRIES, INC., A CORPORATION OF DELAWARE

NEW ROSIN DECOMPOSITION PRODUCT AND PROCESS OF PREPARING THE SAME

No Drawing. Application filed February 26, 1930. Serial No. 431,638.

This invention relates to a decomposition product having hydrocarbon-like properties obtainable from abietic acid and abietic acid containing material, such as rosin, and to a process of preparing the same. The invention further contemplates novel water soluble products which may be prepared from such decomposition product and the method of preparing said water soluble products.

The decomposition product of this invention is similar in many respects to the products obtainable by the pyrogenic decomposition of abietic acid and abietic acid containing material. The production of abietenes from abietic acid or rosin has been carried out by many investigators and described in the literature. A summary of this work appears in Helvetica Chimica Acta, volume 6, pages 838 to 840. As pointed out in this reference the pyrogenic decomposition products of rosin vary considerably in properties, depending upon the source of the rosin used and the method by which the decomposition products are obtained. Various theories have been advanced to explain these differences.

I have now found that a new decomposition product of rosin results when the decomposition is carried out in the special manner set forth below. This product, which I will hereinafter refer to as an "abietene-like hydrocarbon", differs in physical properties from the decomposition products described in the literature. These differences, although appearing but slight when considering the products themselves, are marked when a derivative of the present product, especially a water soluble derivative, is prepared and the same compared with a corresponding derivative of any of the formerly known abietenes.

Said water soluble derivatives, namely, the sulfonation products, possess the valuable property of high capillary-activity which makes these products extremely useful in various industries concerned with the wet treatment of textile fibres, leather and the like. These water soluble products are strong wetting agents.

It is, therefore, an object of this invention to provide a method for preparing this abietene-like hydrocarbon.

It is a further object of this invention to provide a process for preparing the water soluble derivatives of said abietene-like hydrocarbon by treatment of the same with sulfonating agents, such as strong sulfuric acid and anhydrous sulfuric acid.

It is a further object of this invention to produce a new abietene-like hydrocarbon and water soluble salts thereof.

Other and further important objects of this invention will become apparent from the following description and appended claims.

The following examples, in which parts by weight are given, serve to illustrate various embodiments of this invention.

*Example 1.*—15 parts of wood rosin (grade FF) are charged into a cast iron still provided with a reflux column. Although the reaction will also proceed in other vessels, an iron vessel is preferred due to the advantageous catalytic effect which iron has upon the reaction. The rosin is heated and refluxed, generally at a temperature of about 350 to 375° C., until its acidity has practically disappeared, which point can be readily ascertained by taking suitable test samples. The refluxing when carried out in laboratory size apparatus usually requires about three to four hours. During this period, a certain portion of non-condensable gases are distilled off, along with gases containing water and oil.

At the end of the reflux period the residue is distilled from the iron still, condensed, and collected in a separate receiver. The distillation is continued until the temperature of the decomposition mass reaches about 450° C. The crude distillate represents about 10 parts by weight. This crude product can be further purified by vacuum distillation. The vacuum distilled product has a specific gravity of about 0.98 to 0.99 at 20° C. and contains less than 1% of abietic acid. It distills for the most part in a standard distilling flask between 315 and 370° C.

A sodium salt prepared from the sulfonation product of this material by sulfonating the material and neutralizing the sulfonate in accordance with the process outlined below can be readily powdered. Furthermore, upon treatment of said abietene-like hydrocarbon with hydrogen in the presence of nickel in accordance with the process described in the copending application of Ivan Gubelmann and myself, Serial No. 431,626, filed of even date herewith, both the amount of hydrogen taken up and the products obtained differ substantially from the amount of hydrogen taken up and the hydrogenation products formed in treating the known abietenes in a similar manner.

In the above example, wood rosin of grade FF is specified as the starting material. I have, however, employed other grades of wood rosin, as well as abietic acid per se as the starting material and have obtained similar products. It is also to be understood that other details of the process such as temperature, time of heating and the like may be varied, the gist of the procedure probably depending upon the principle that the abietic acid containing material in the iron still is heated until its acidity has practically disappeared.

*Example 2.*—The abietene-like hydrocarbon as prepared above is sulfonated in accordance with the process disclosed in the copending application of Henke and Weiland, Serial No. 400,151, filed October 16, 1929. More specifically, this sulfonation process is as follows:

1000 parts of sulfuric acid (monohydrate) are cooled to 10° C. and, while stirring, 500 parts of the abietene product obtained according to Example 1, added over a period of two hours. The mass is maintained at a temperature of from 0 to 15° C. and stirred for an additional 20 hours at approximately that temperature. At the end of that time it is poured into 1000 parts of water to effect a separation into layers. Separation of the layers may be made while hot, but it is preferable to first allow the mass to cool to room temperature. The dilute sulfuric acid layer is then separated from the sulfonic acid layer (upper layer) mechanically. The sulfuric acid is discarded. The sulfonic acid is in the form of a dark paste. It is dissolved in water and neutralized with caustic soda solution. This neutral solution comprising the sodium salt is filtered and the filtrate evaporated to dryness, whereupon the sodium salt of the sulfonation product is obtained in the form of a spongy mass which can be readily pulverized to a practically non-hygroscopic powder. The sodium salt is quite insoluble in organic solvents, such as, benzene, solvent naphtha and the like.

If in the above process other neutralizing agents are used, such as, for instance, sodium carbonate, potassium hydroxide, ammonium hydroxide, or the like, the corresponding water soluble salts are obtained. The water soluble alkali metal sulfonates may be readily handled and employed in various industries.

The sulfonated products as well as their water soluble salts possess a stronger wetting action than the sulfonation products and corresponding water soluble salts of the known abietenes.

Other ratios of reacting materials may be employed in the above example. It is also possible to reverse the addition procedure, that is, the sulfuric acid may be added to the abietene-like product.

The temperature range of the process may also be varied and other sulfonating agents employed as particularly pointed out in the copending application of Clyde O. Henke and Henry J. Weiland, Serial No. 400,151, filed October 19, 1929, which is chiefly concerned with the sulfonation of the abietene material.

Alternately, but not a preferred method, the sulfonation mass above prepared may be added to water and then either used as such or the aqueous solution may be neutralized with basic material such as caustic soda, potassium carbonate, ammonium hydroxide and the like. The solution of neutralized material may be used as such or it may be evaporated to dryness.

I am aware that many changes may be made, and numerous details of this process may be varied through a wide range without departing from the principles of my invention and I, therefore, do not purpose limiting the patent granted hereon otherwise than as necessitated by the prior art.

I claim as my invention:

1. The process of preparing an abietene-like hydrocarbon which comprises refluxing an abietic acid containing material at atmospheric pressure until practically all the abietic acid is decomposed and then distilling the refluxed mass at a temperature below 450° C.

2. The process of preparing an abietene-like hydrocarbon which comprises refluxing abietic acid containing material at atmospheric pressure in the presence of iron until practically all the abietic acid is decomposed and then distilling the refluxed mass at a temperature below 450° C.

3. The process of preparing an abietene-like hydrocarbon, which comprises refluxing rosin at a temperature of about 350 to 375° C. until the acidity of the rosin substantially disappears and distilling the refluxed mass at a temperature below 450° C.

4. The process of preparing an abietene-like hydrocarbon which comprises refluxing rosin at a temperature of about 350 to 375° C. in the presence of iron until the acidity of the rosin substantially disappears and distilling the refluxed mass at a temperature below 450° C.

5. The process of preparing an abietene-like hydrocarbon, which comprises refluxing wood rosin at a temperature ranging from about 350 to 375° C. until the acidity of the rosin substantially disappears, distilling the refluxed mass at a temperature below 450° C. and collecting the distillate.

6. The process as in claim 5 wherein the starting material is wood rosin of a grade FF, and said starting material is refluxed in the presence of iron.

7. As a new composition of matter, a pyrogenic decomposition product of abietic-acid-containing material, said product having a specific gravity of about 0.98 to 0.99 and the chemical property of yielding upon sulfonation a product which in the form of its sodium salt is a dry pulverizable mass.

8. As a new composition of matter, a pyrogenic decomposition product of abietic-acid-containing material, said product containing less than 1% of abietic acid, and having a specific gravity of between 0.98 and 0.99 and distilling at a temperature ranging from 315 to 370° C.

9. As a new composition of matter, a pyrogenic decomposition product of abietic-acid-containing material which is substantially identical with the product prepared by refluxing rosin of grade FF in the presence of iron to practically complete decomposition of the abietic acid, then distilling the mass and recovering the fraction distilling below 450° C.

10. The process of preparing high wetting power, water soluble sulfonation products of the abietene family, which comprises refluxing a mass of abietic-acid-containing material in the presence of iron until its acidity has practically disappeared, distilling the mass to recover a fraction which distills below 450° C., treating said fraction with a strong sulfonating agent and neutralizing the sulfonated mass by means of an alkali metal base.

11. As a new composition of matter, a water soluble sulfonation product derivable by treating the product of claim 9 with a strong sulfonating agent.

12. As a new composition of matter, an alkali metal salt of a sulfonation product of a hydrocarbon mixture of the abietene family, said alkali metal salt being a solid substance, non-hygroscopic, readily powderable, soluble in water and insoluble in benzene.

In testimony whereof I have hereunto subscribed my name at Carrollville, Milwaukee County, Wisconsin.

CLYDE O. HENKE.